United States Patent
Nishiuchi

(10) Patent No.: US 7,430,305 B2
(45) Date of Patent: Sep. 30, 2008

(54) IMAGE VELOCITY COMPUTER AND METHOD FOR COMPUTING IMAGE VELOCITY

(75) Inventor: Hidekazu Nishiuchi, Chiba (JP)

(73) Assignee: Nissan Motor Co., Ltd., Yokohama-shi, Kanagawa (JP)

( * ) Notice: Subject to any disclaimer, the term of this patent is extended or adjusted under 35 U.S.C. 154(b) by 0 days.

(21) Appl. No.: 11/611,531

(22) Filed: Dec. 15, 2006

(65) Prior Publication Data

US 2007/0139565 A1    Jun. 21, 2007

(30) Foreign Application Priority Data

Dec. 20, 2005 (JP) ............................. 2005-365779
Sep. 12, 2006 (JP) ............................. 2006-246745

(51) Int. Cl.
*G06K 9/00* (2006.01)
(52) U.S. Cl. ..................... 382/107; 382/103; 356/28
(58) Field of Classification Search .................. 356/28; 382/103, 107
See application file for complete search history.

(56) References Cited

U.S. PATENT DOCUMENTS

| | | | |
|---|---|---|---|
| 2003/0099295 A1* | 5/2003 | Averbuch et al. | 375/240.16 |
| 2004/0027347 A1* | 2/2004 | Farsaie | 345/419 |
| 2005/0195383 A1* | 9/2005 | Breed et al. | 356/4.01 |
| 2005/0220356 A1* | 10/2005 | Shinbata et al. | 382/254 |
| 2006/0088201 A1* | 4/2006 | Delaney | 382/152 |

FOREIGN PATENT DOCUMENTS

JP    11-160335    6/1999

\* cited by examiner

*Primary Examiner*—Thomas H. Tarcza
*Assistant Examiner*—Timothy A Brainard
(74) *Attorney, Agent, or Firm*—Young Basile

(57) ABSTRACT

An image velocity computing device having a camera, a microcomputer, and a camera control is provided. The camera has a controllable exposure time, and is capable of capturing a plurality of images of objects. The microcomputer is coupled to the camera and is configured to determine an image flow of an object of at least one pixel occurring in images captured by the camera, to determine an exposure time to achieve a predetermined image flow, and to compute an image velocity based on the exposure time of the camera. The camera control is configured to receive exposure time information from the microcomputer and to control the exposure time of the camera.

17 Claims, 9 Drawing Sheets

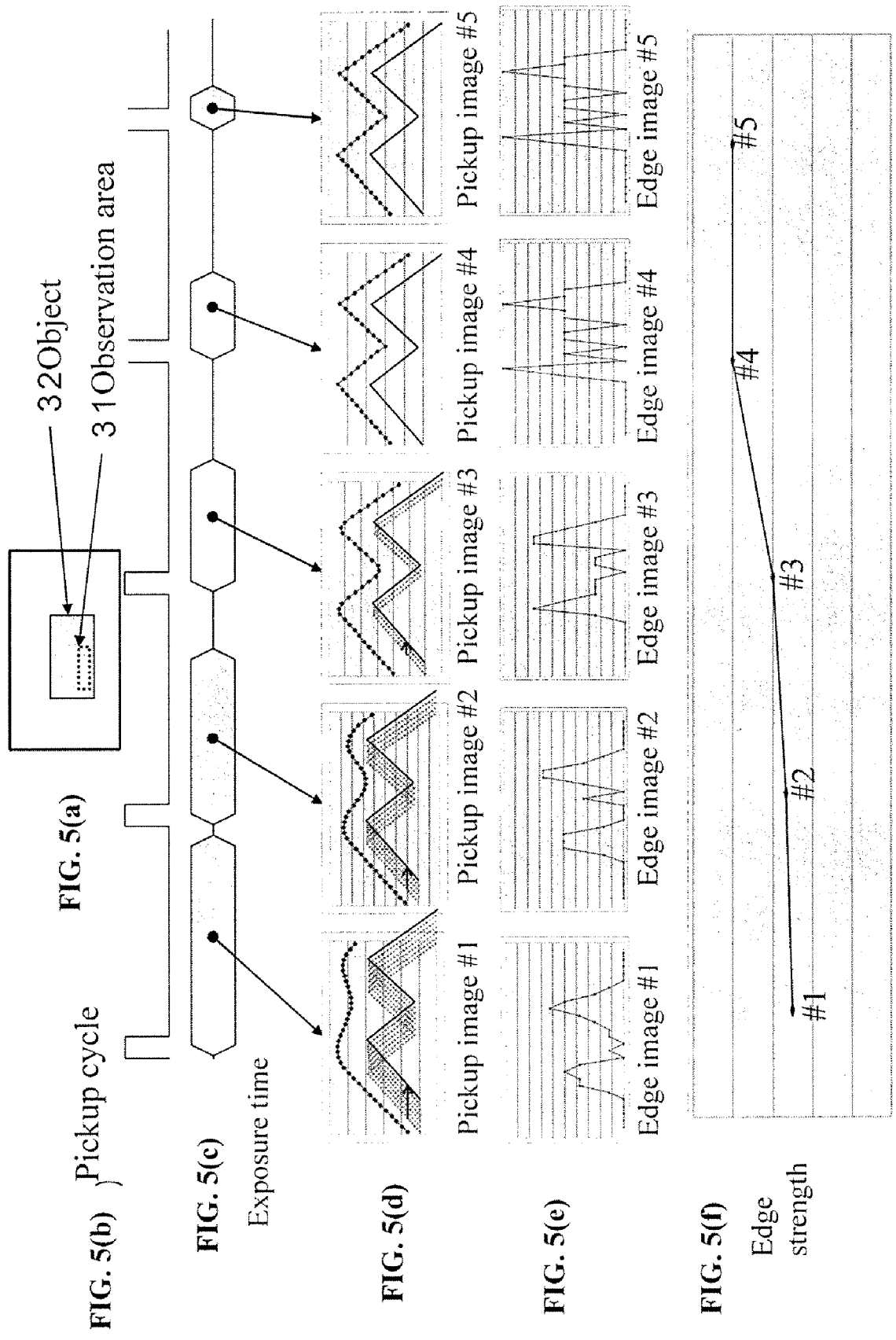

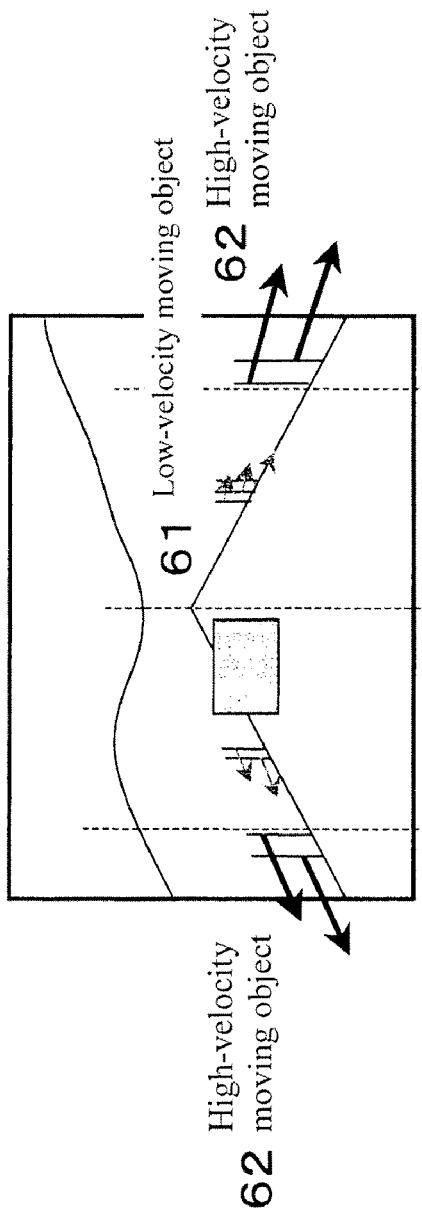
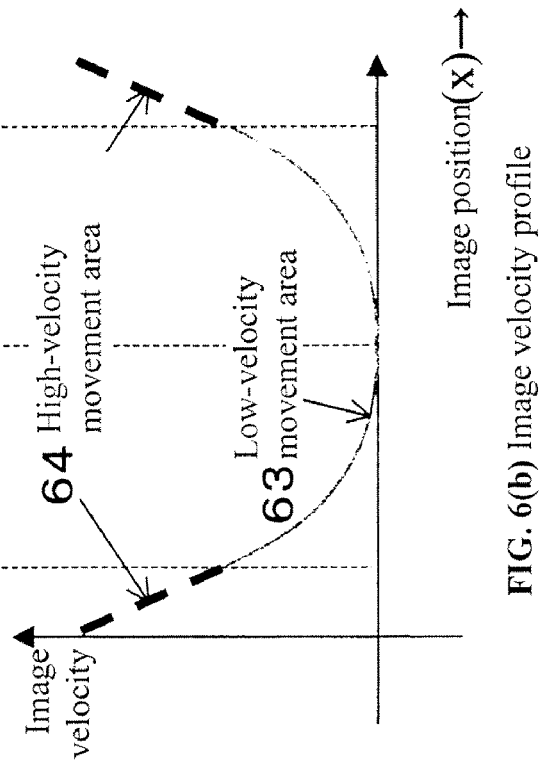
FIG.6(a) Pickup image
FIG. 6(b) Image velocity profile

IMAGE VELOCITY COMPUTER AND METHOD FOR COMPUTING IMAGE VELOCITY

FIELD OF THE INVENTION

The present invention generally relates to an image velocity computer and, more particularly, to an image velocity computer and method for computing the velocity of a pickup image.

BACKGROUND OF THE INVENTION

Japanese Kokai Patent Application No. Hei 11[1999]-160335 describes a conventional image velocity computer. The JP '335 publication teaches that, in order to compute the image velocity, an optical flow (i.e., a vector indicating movement on an image) of a target object is computed. The image velocity is computed based on the direction and the level of the computed optical flow.

To calculate the optical flow, a gradient computation method is applied to an image that is generated by an on-vehicle camera. The gradient computation method assumes that the optical flow can be computed by solving simultaneous constraint equations based on discretely sampled images. The method also assumes that the gray values of the target object are retained. However, the gray value distribution of the target object fluctuates significantly when the target object is moving rapidly. For this reason, it is difficult to accurately compute the image velocity when the target object is moving rapidly. Accordingly, a need exists for an improved image velocity computer that can accurately compute image velocity even when an image velocity computation target is moving at a high velocity.

BRIEF SUMMARY OF THE INVENTION

In one example, an image velocity computing device having a camera, a microcomputer, and a camera control is provided. The camera has a controllable exposure time, and is capable of capturing a plurality of images of objects. The microcomputer is coupled to the camera and is configured to determine an image flow of an object of at least one pixel occurring in images captured by the camera, to determine an exposure time to achieve a predetermined image flow, and to compute an image velocity based on the exposure time of the camera.

DESCRIPTION OF THE SEVERAL VIEWS OF THE DRAWINGS

Various examples of objects, features and attendant advantages of the present invention will become fully appreciated as the same becomes better understood when considered in conjunction with the accompanying drawings, in which like reference characters designate the same or similar parts throughout the several views, and wherein:

FIGS. 5(a)-5(f) are a series of diagrams that graphically illustrate example of how an accurate image velocity calculation can be made by means of an edge analysis;

FIG. 6(a) shows a pickup image ahead of a vehicle using a camera installed at a front part of a vehicle;

FIG. 6(b) shows an image velocity profile for the pickup image shown in FIG. 6(a);

DETAILED DESCRIPTION OF THE INVENTION

Figure 1:
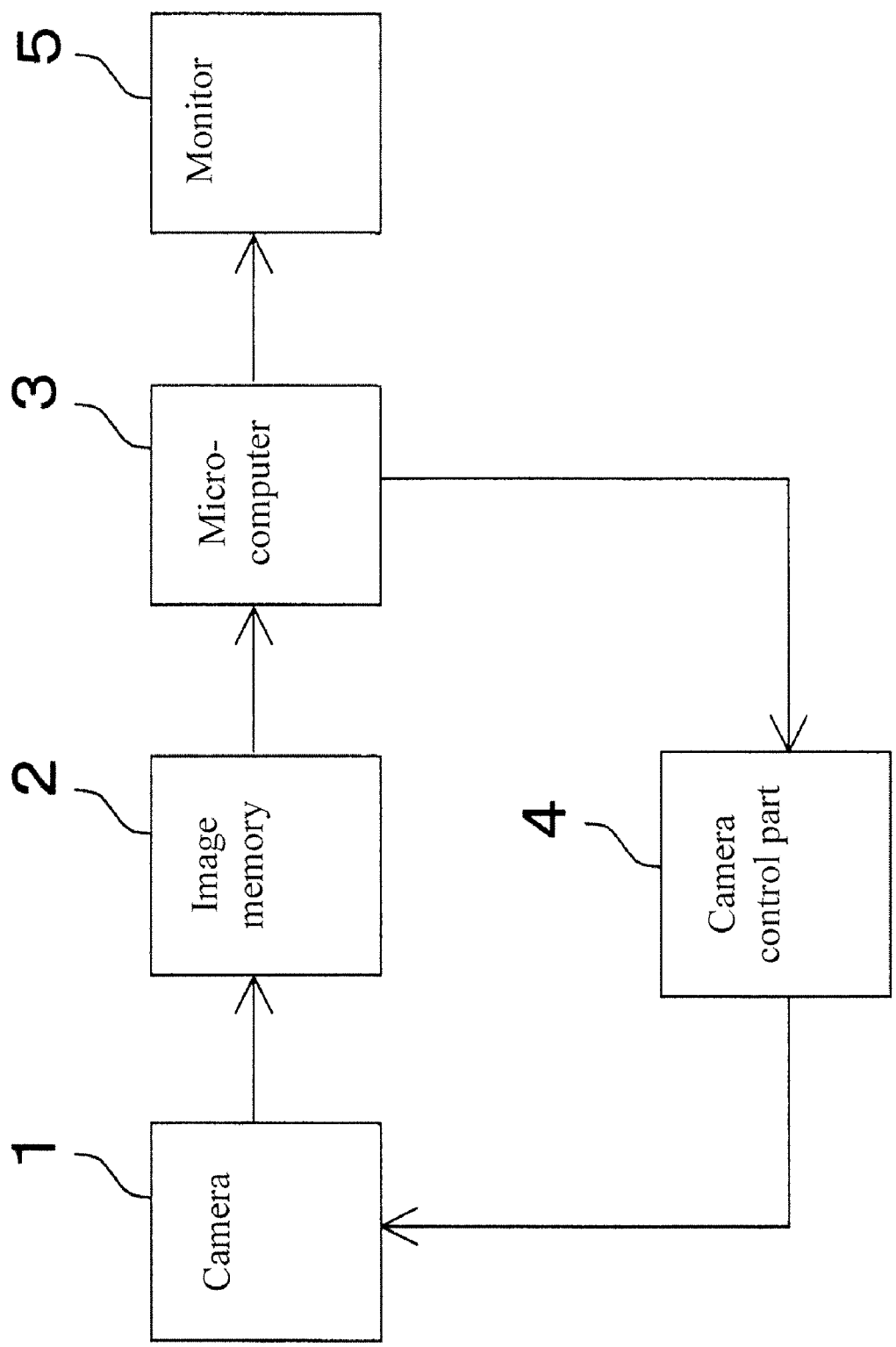
FIG. 1 is a block diagram showing the configuration of an exemplary image velocity computer system that is manufactured in accordance with aspects of the present invention.

While the present invention is susceptible of embodiment in various forms, there is shown in the drawings and will hereinafter be described a presently preferred embodiment with the understanding that the present disclosure is to be considered an exemplification of the invention and is not intended to limit the invention to the specific embodiment illustrated. It should be further understood that the title of this section of this specification, namely, "Detailed Description Of The Invention", relates to a requirement of the United States Patent Office, and does not imply, nor should be inferred to limit the subject matter disclosed herein.

In the present disclosure, the words "a" or "an" are to be taken to include both the singular and the plural. Conversely, any reference to plural items shall, where appropriate, include the singular.

FIG. 1 is a block diagram showing the configuration of an exemplary embodiment of an image velocity computer that is manufactured in accordance with aspects of the present invention. In a broad sense, the image velocity computer includes a pickup means, an image memory, an image flow determination means, an exposure time changing means, an image velocity computation means. The image velocity computer may also include, for example, a pixel movement determination means, such as a 1-pixel movement determination means, a 1-pixel movement changing means, and a monitor 5.

The pickup means can be, for example, a high speed camera 1. The image flow determination means, an exposure time changing means, an image velocity computation means, and a 1-pixel movement determination means can be incorporated into, for example, the memory 2 and the microcomputer 3. The 1-pixel movement changing means can be formed by, for example, a camera control part 4.

The camera 1 is utilized to capture a pickup image. The image memory 2 converts the level of brightness or luminance of the image captured by the camera 1 into a digital value and holds it. A microcomputer 3 processes the image held in the image memory 2 in order to compute the image velocity of a movement area. The image velocity is the amount of movement per unit time in a movement area, and the movement area is the area that corresponds to a target moving on the image.

The microcomputer 3 also computes the shutter speed of the camera 1 that is to be set when computing the image velocity, and then sends the shutter speed to the camera control part 4. The camera control part 4 controls the shutter speed of the camera 1 so as to attain the shutter speed instructed by the microcomputer 3. At this point, the length of the exposure time is determined based on the speed of the electronic or mechanical shutter of the camera 1.

The exposure time and shutter speed of the camera are inversely related. In particular, as the exposure time increases, shutter speed decreases. Conversely, as the exposure time decreases, shutter speed increases. The monitor 5 is used to display the image stored in the image memory 2 and the image velocity information.

Figure 2:
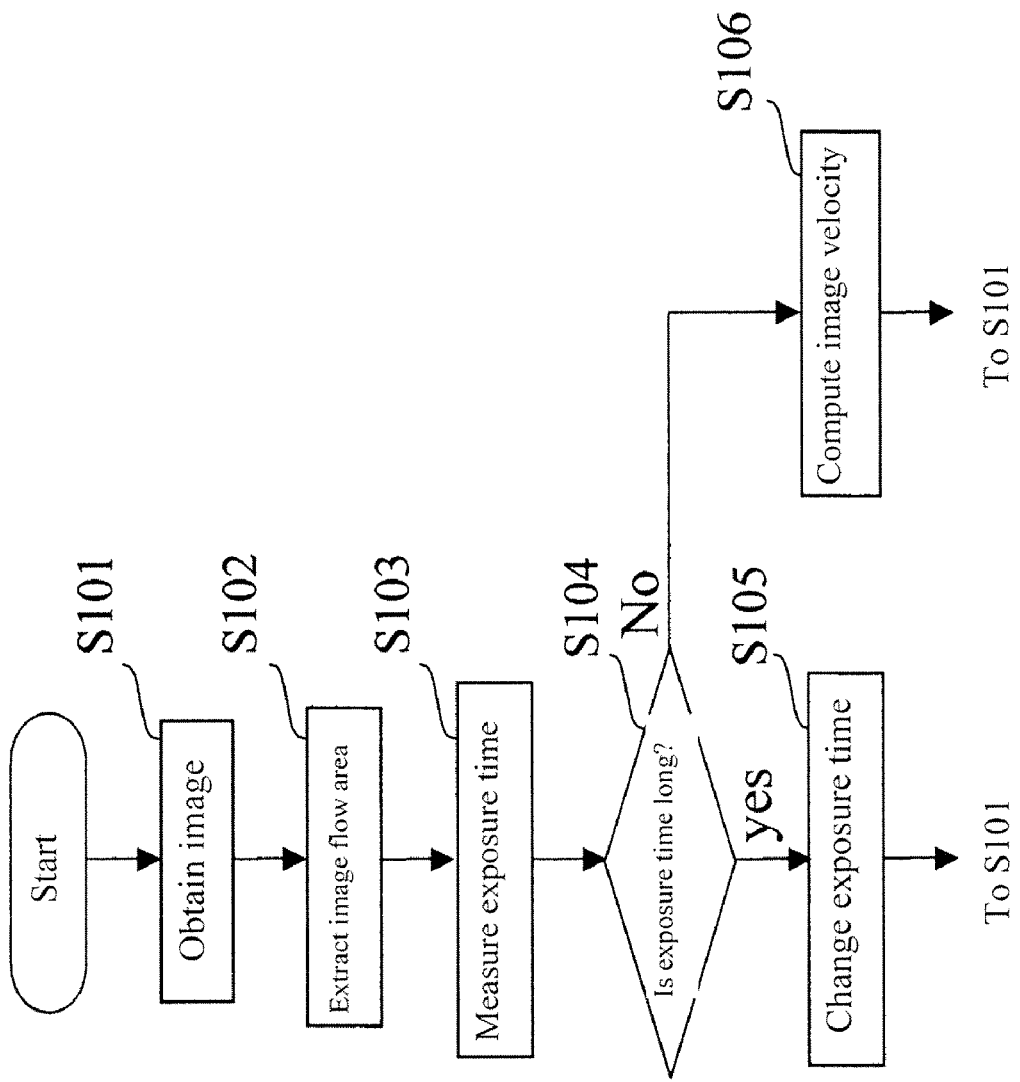
FIG. 2 is a chart that shows a group of steps that are followed to allow an accurate image velocity calculation to be made in accordance with a first embodiment of the present invention.

FIG. 2 is a chart that shows a group of steps that are followed to allow an accurate image velocity calculation to be made in accordance with a first embodiment of the present invention. First, in S101, a pickup image is obtained by the pickup means which, in the embodiment shown in FIG. 1, is high speed camera 1. Next, in S102, an image flow area is extracted when an image flow occurs in the pickup image.

In this embodiment of the invention, one pixel refers to the minimum unit that constitutes one image. Image flow means, for example, a so-called flow of an image that occurs when a pickup target object moves for one or more pixels while the camera 1 is exposed. For example, in a situation in which a pedestrian has run in front of a vehicle or in a situation in which when an image ahead is captured continuously from a traveling vehicle, objects in the image may appear to flow from the center to the surroundings.

In S103, the exposure time for the image flow area is measured. Next, in S104, the length of the exposure time for the image flow area is determined. Processing in S105 is executed if the exposure time is long, and processing in S106 is executed if the exposure time is not too long. If the exposure time is too long, then the exposure time of the camera 1 is reduced by a prescribed value in S105 before returning to S101. If the exposure time is not too long, the reciprocal of the current exposure time is computed in S106 in order to compute the velocity of the image flow area before returning to S101.

As described above, because the image flow area is extracted when an image flow occurs in the pickup image, multiple captured pickup images are processed while changing the exposure time of the camera 1. When an image flow occurs, the exposure time is reduced, and the image velocity of the target is computed based on the reduced exposure time. In this manner, the image velocity of the target can be computed even when the target is moving at a high velocity on the screen.

Figure 3:
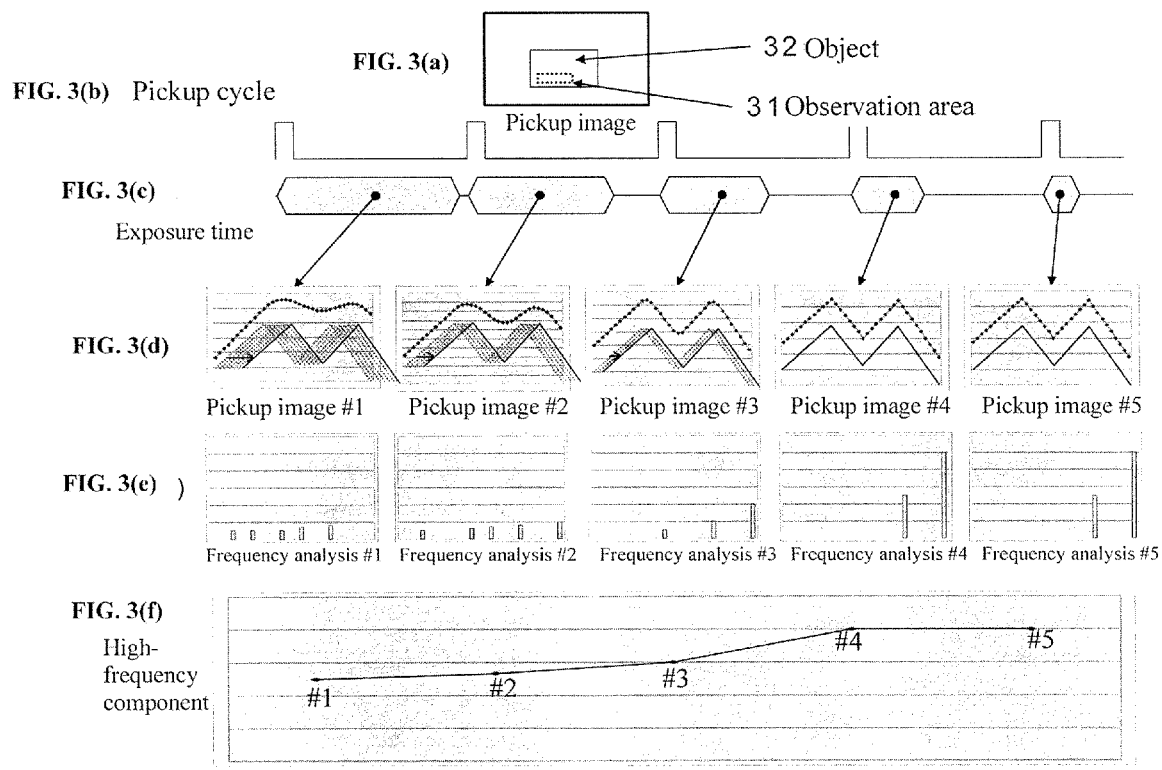
FIGS. 3(a)-3(e) are a series of diagrams that graphically illustrate an example of how an accurate image velocity can be calculated by means of a frequency analysis.

FIGS. 3(*a*)-3(*f*) contain a series of diagrams that graphically illustrate an example of how an accurate image velocity can be calculated by means of a frequency analysis. FIG. 3(*a*) shows a pickup image. Location 31 represents an observation area, and location 32 represents an object in the image. FIG. 3(*b*) shows a pickup cycle for capturing an image in one frame using the camera 1. A frame is a unit that corresponds to one image captured by the camera 1. FIG. 3(*c*) shows the exposure times of the camera 1. FIG. 3(*d*) shows pickup images #1-#5. FIG. 3(*e*) shows frequency analyses #1-#5 that correspond to pickup images #1-#5. FIG. 3(*f*) shows high-frequency components found in frequency analyses #1-#5, respectively.

If the exposure time is long, an object moving at a high velocity ultimately flows for more than one pixel while the shutter is open for exposure. Therefore, an image flow ultimately occurs on the pickup image as shown in pickup images #1-#3 in FIG. 3(*d*). However, when the exposure time is reduced, the target no longer moves for more than one pixel while the shutter is open for exposure. Thus, an image without any image flow can be captured as shown in pickup images #4 and #5 in FIG. 3(*d*).

When frequency analyses are applied to pickup images #1-#5 in the manner shown in FIG. 3(*e*), less high-frequency components are generated when there is significant image flow on the pickup image. Conversely, more high-frequency components are generated when there is less image flow on the pickup image.

As shown in FIG. 3(*f*), the high-frequency component reaches a maximum and is steady (no longer changes) when no image flow is present in the image. Therefore, the point at which the image flow no longer occurs can be found by reducing the exposure time in an iterative process. The iterative process is stopped at an exposure time at which the high-frequency component is the same as the high-frequency component generated in the previous iteration. At that point, the exposure time equals the time required for an object to move for one pixel. That is, the reciprocal of the exposure time becomes the image velocity of the target.

Figure 4:
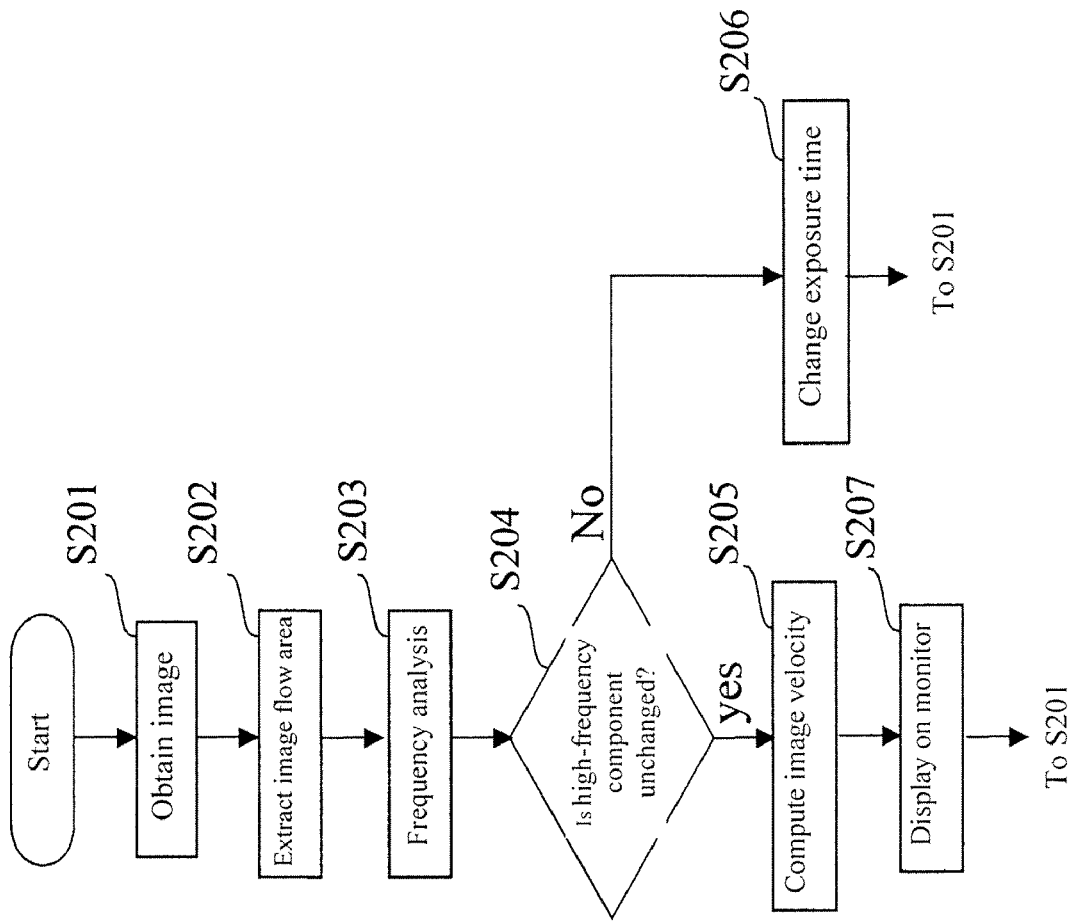
FIG. 4 is a chart that shows a group of steps that are followed to allow an accurate image velocity calculation to be made using the computation method as depicted in FIGS. 3(a)-3(e)

FIG. 4 is a chart that shows a group of steps that are followed to allow an accurate image velocity calculation to be made using the computation method as depicted in FIGS. 3(*a*)-3(*f*) and as described above. First, in S201, a pickup image by the camera 1 (as shown in FIG. 1) or other pickup means is obtained. Next, in S202, an observation area (refer to 31 in FIG. 3) is selected in the pickup image, and when an image flow occurs, an image flow area is extracted. Next in S203, frequency analyses are applied to the extracted image flow area using, for example, a Fast Fourier Transform (FFT) technique in order to observe changes in the high-frequency component.

In S204, it is determined whether or not there is a change in the high-frequency component. To do this, the high-frequency component in the image flow area in the pickup image for a given exposure time is compared with the high-frequency component in the image flow area in the pickup image using a reduced exposure time. Processing in S205 is carried out if the amount of change is equal to or less than a prescribed value. Processing in S206 is carried out if the amount of change is greater than a prescribed value. If the amount of change is equal to or less than the prescribed value, then the reciprocal of the current exposure time is computed in S205 so as to compute the velocity of the high-velocity movement area before advancing to S207. Conversely, if the amount of change is greater than the prescribed value, then the exposure time of the camera 1 is reduced by a prescribed value in S206 before returning to S201. Finally, in S207, an appropriate monitor indication of the image velocity computed in S205 is displayed on the monitor 5 before returning to S201.

As described above, because the image flow on the pickup image is determined, multiple pickup images are processed by changing the exposure time of the camera 1 rapidly so as to extract the pickup image with no image flow. Then, the image velocity of the target is computed based on the exposure time used, and even when the target is moving at a high velocity, the image velocity of the target can be accurately computed.

FIGS. 5(*a*)-5(*f*) are a series of diagrams that graphically illustrate an example of how an accurate image velocity calculation can be made. The image velocity calculation shown in FIGS. 5(a)-5(f) is different from the image velocity calculation shown in FIGS. 3(a)-3(f). However, the diagrams in FIGS. 5(a)-5(f) are similar to the diagrams in FIGS. 3(a)-3(f), so explanation of overlapping portions are omitted.

FIG. 5(a) shows a pickup image. FIG. 5(b) shows a pickup cycle for capturing a pickup image in one frame using the camera 1 or other pickup means. A frame is a unit that corresponds to one image captured by the camera 1. FIG. 5(c) shows various exposure times. FIG. 5(d) shows pickup images #1-#5. FIG. 5(e) shows edge images #1-#5 corresponding to pickup images #1-#5 in FIG. 5(d), respectively. FIG. 5(f) shows edge strengths of edge images #1-#5 in FIG. 5(e).

Similar to FIGS. 3(a)-3(f), when the exposure time is long, an object moving at a high velocity ultimately moves for more than one pixel while the shutter is open for exposure. Therefore, an image flow occurs in the captured pickup image as shown in pickup images #1-#3 in FIG. 5(d). However, when the exposure time is reduced, the target no longer moves for more than one pixel while the shutter is open for exposure. In this manner, images with no image flow can be captured as shown in pickup images #4 and #5 in FIG. 5(d).

Observations of the edge strengths of the pickup images #1-#5 show that the greater the image flow becomes, the weaker the edge strength. Conversely, the less the image flow becomes, the greater the edge strength. The edge strength reaches a maximum and is steady when there is no image flow as shown in FIG. 5(f).

The point at which the image flow no longer occurs can be found by reducing the exposure time continuously until the exposure time at which the edge strength no longer changes is extracted. At that point, the exposure time is the time required for the target to move for one pixel. That is, the reciprocal of the exposure time becomes the image velocity of the target. In this manner, the image velocity of the target can be computed by computing the reciprocal of the exposure time even when the target is moving at high velocity on the screen.

It is within the scope of the present invention to, for example, allow the camera 1 or other pickup means (or the entire image velocity computer) to be installed on a moving body such as, for example, an automobile. In accordance with this aspect of the present invention, the camera 1 is installed, for example, at the front part of the vehicle to capture images ahead of the vehicle. A monitor 5 is installed in the vehicle in order to display images held in the image memory 2 while superimposing image velocity information computed by the microcomputer 3. The image velocity is computed by the microcomputer 3 while changing the exposure time of the camera 1 using the camera control part 4.

FIG. 6(a) shows a pickup image ahead of a vehicle using a camera 1 installed at the front part of the vehicle. FIG. 6(b) shows an image velocity profile for the pickup image show in FIG. 6(a). Image velocities at respective coordinate positions in the horizontal direction are processed, and the most frequent image velocity (due to the movement of the vehicle, that is, the camera 1) is plotted. In FIG. 6(a), location 61 represents a low-velocity moving object, and location 62 represents a high-velocity moving object. In FIG. 6(b), location 63 represents a low-velocity movement area, and location 64 represents a high-velocity movement area.

When the vehicle is traveling forward on a road, and the camera 1 or other pickup means is moving in the direction of the optic axis (the y-axis), the image moves sideways relative to the optic axis of the camera 1. In addition, the farther away the image moves from the direction of the optic axis of the camera 1, the greater the velocity becomes. According to these characteristics, an object image captured close to the optic axis of the camera 1 has little movement on the image, and the object image remains stationary as a low-velocity moving object 61, which does not move for more than one pixel across frames (a frame is a unit indicating one image captured by the camera 1). As such, the image velocity of the low-velocity moving body 61 can be computed by counting the number of frames while the low-velocity moving body 61 remains at a particular pixel.

A high-velocity movement area 64 moves for more than one pixel and thus shows a high-velocity moving object 62 at either end of the pickup image. The image velocity profile of a high-velocity movement area 64 can be estimated (as indicated by the broken line in FIG. 6(b)) by considering spatial continuity based on the image velocity profile of a low-velocity movement area 63 (as indicated by the solid line in FIG. 6(b)). In order for this estimation to occur, the low-velocity moving body 61 computed in the manner described above must be present. In this manner, the image velocity of a high-velocity movement area 64 is corrected based on the estimated image velocity profile of a low-velocity movement area 63. Then, a relative velocity generated by the movement of the camera 1 can be eliminated even when the camera 1 is moving.

Figure 7:
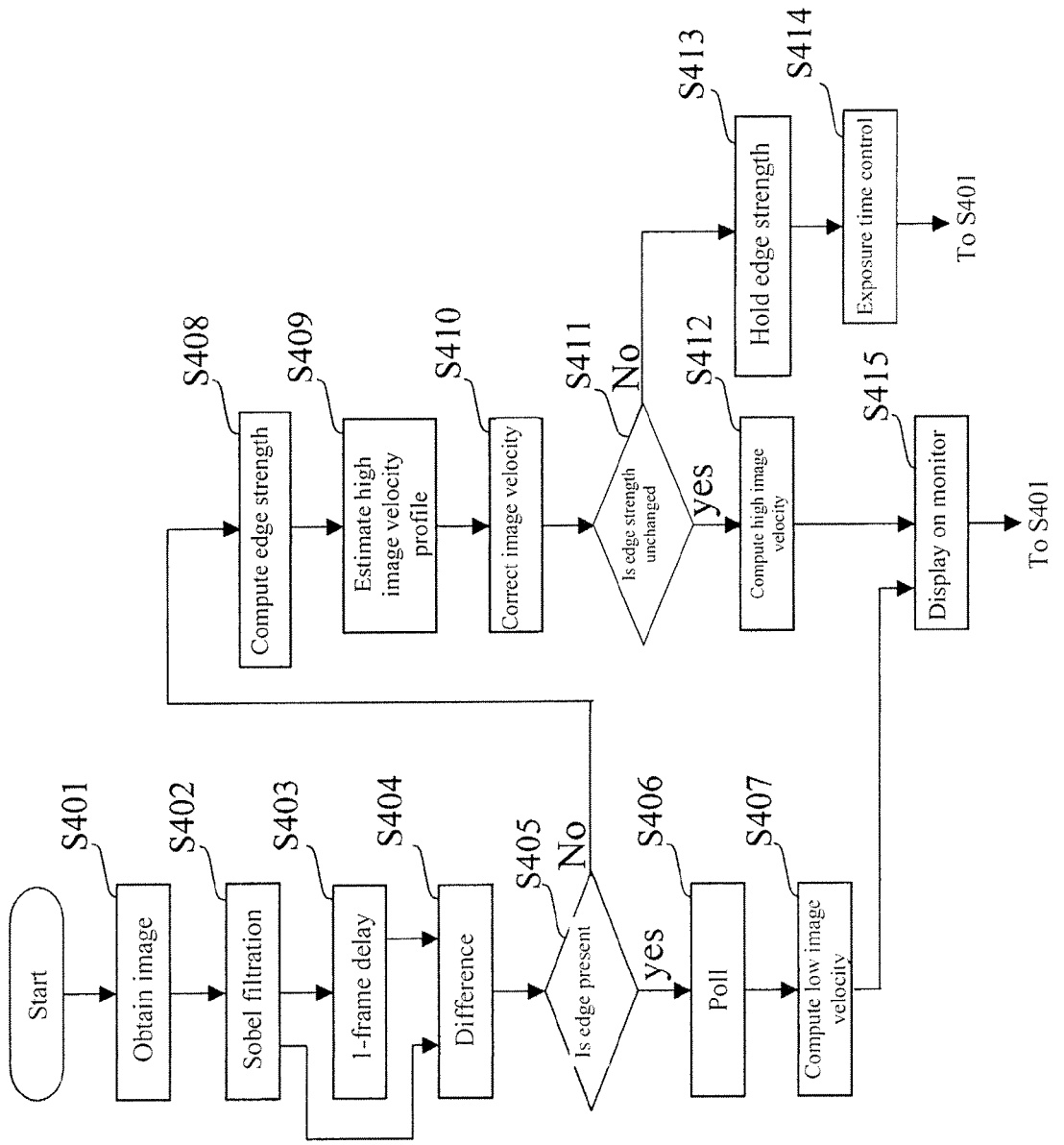
FIG. 7 is a chart that shows a group of steps that are followed to allow an accurate image velocity calculation to be obtained when a camera or other pickup means is installed on a moving body.

FIG. 7 is a chart that shows a group of steps that are followed to allow an accurate image velocity calculation to be obtained when a camera 1 or other pickup means is installed on a moving body. An example of the present invention that utilizes the image velocity computation means as depicted in FIGS. 5(a)-5(f) will be explained hereinafter.

First, in S401, a pickup image by the camera 1 (as show in FIG. 1) or other pickup means is obtained. Next, in S402, Sobel filtration processing is applied to the pickup image, and the pickup image is stored in the image memory 2 in order to compute a lateral edge image. Next, in S403, an image is obtained by delaying by one frame the lateral edge image computed in S402, and the delayed image is held in the image memory 2. Next, in S404, an image showing the difference between the lateral edge image, as computed in S402, and the delayed lateral image, as computed in S403, is computed. Next, in S405, whether or not an edge is present is determined based on the lateral edge differential image computed in S404. S406 is executed if there is an edge, and S408 is executed if there is not an edge.

In S406, the number of frames present at the same pixel in the image differential image extracted in S405 is counted (polled). Next, in S407, the reciprocal of the number of frames present at the same pixel as counted in S406 is obtained in order to compute the image velocity of the lateral edge. This is the velocity of the low-velocity image. Then, the velocity of the low-velocity image is sent to the monitor 5 (see FIG. 1).

Conversely, when a decision is made in S405 that there is no edge, an edge strength of the lateral edge extracted in S402 is computed in S408. Next, in S409, the velocity at which the highest number of image velocities are present at the same x coordinate is computed for each x coordinate (horizontal direction of the image). Then, a velocity profile of the high-velocity image is estimated (broken lines in FIG. 6(b)) by satisfying spatial continuity based on the computed low image velocity profile. In this manner, an image velocity profile is computed across all x coordinates, including the high-velocity movement areas at either end of the screen.

Next, in S410, a relative velocity generated by the movement of the vehicle (that is, the camera 1 or other pickup means), is eliminated based on the image velocity profile information computed in S409 in order to correct the velocity of the high-velocity image. That is, the edge strength of the lateral edge of the previous frame that was present at the position shifted by the degree corresponding to the image velocity estimated in S409 is read.

In S411, the edge strength in the image flow area in the pickup image using a given exposure time (as computed in S408) is compared with the edge strength in the image flow area in the pickup image using a reduced exposure time (as read in S410). Processing in S412 is executed if the amount of change is equal to or less than a prescribed value, and processing in S413 is executed if the amount of change is greater than a prescribed value. If the amount of change is equal to or less than the prescribed value, then, in S412, the reciprocal of the current exposure time is computed as the image velocity of the lateral edge extracted in S405. Conversely, if the amount of change is greater than the prescribed value, then, in S413, the position of the lateral edge and the edge strength as computed in S408 are retained.

In S414, the exposure time of the camera 1 is reduced by a prescribed value before returning to S401. In S415, appropriate monitor indications of the image velocities computed in S407 and S412 are displayed on the monitor 5. Image information computed by the microcomputer 3 is superimposed over the image held in the image memory 2 using different hues. For example, an image that moves to the right on the screen is displayed in blue, and an image that moves to the left is displayed in red.

Because the configuration is such that movement of the high-velocity movement area is estimated using the image velocity measured in the low-velocity movement area, even when the camera 1 or other pickup means is installed on a moving body and is moving, the relative image velocity due to the movement can be cancelled out. Therefore, even when the camera 1 is installed on a moving body, such as a vehicle, and the moving body is moving, the image velocity can be computed. Furthermore, even the image velocity of a target that is close to the moving camera 1 and is moving at a relatively high velocity can be computed.

One aspect of the present invention is that image velocity is computed using a camera or other pickup means (see the camera 1 in FIG. 1) that is capable of capturing images at multiple different exposure times starting at a prescribed time. FIG. 8(a) is a schematic diagram that shows the movement of a target at times $T_0$-$T_4$ at intervals of T after prescribed time $T_0$ with respect to the camera. $\theta_1$ is the field angle per one pixel of the camera 1. $\theta_2$, $\theta_3$ and $\theta_4$ are angles extending from the camera 1 to the target at times $T_0$-$T_4$, respectively. Although only $T_0$-$T_4$ are given as examples in the figure, more times may be involved.

Pickup images #1-#4 in FIG. 8(b)-(e), respectively, are pickup images that are captured in one frame while exposed for different exposure times: $T_0$-$T_1$, $T_0$-$T_2$, $T_0$-$T_3$, and $T_0$-$T_4$. That is, after the exposure time is exposed, the images are captured at respective times $T_1$, $T_2$, $T_3$, and $T_4$. For example, when T seconds is equal to the time required to move for one pixel, because pickup image #1 has been exposed for T seconds, that is, $T_0$-$T_1$, the target is present within the same pixel. In the cases of pickup images #2-#4, because the target moves for 2 pixels, 3 pixels, and 4 pixels while the shutter is open during $T_0$-$T_2$, $T_0$-$T_3$, and $T_0$-$T_4$, respectively, an image flow occurs.

Because images are captured at multiple exposure times starting from prescribed time $T_0$ in the described manner, an image without an image flow in pickup images #1-#4 can be extracted by carrying out the frequency analyses as described above (see FIG. 3) or the edge strength observations as described above (see FIG. 5). The image velocity can then be measured accordingly.

Figure 8:
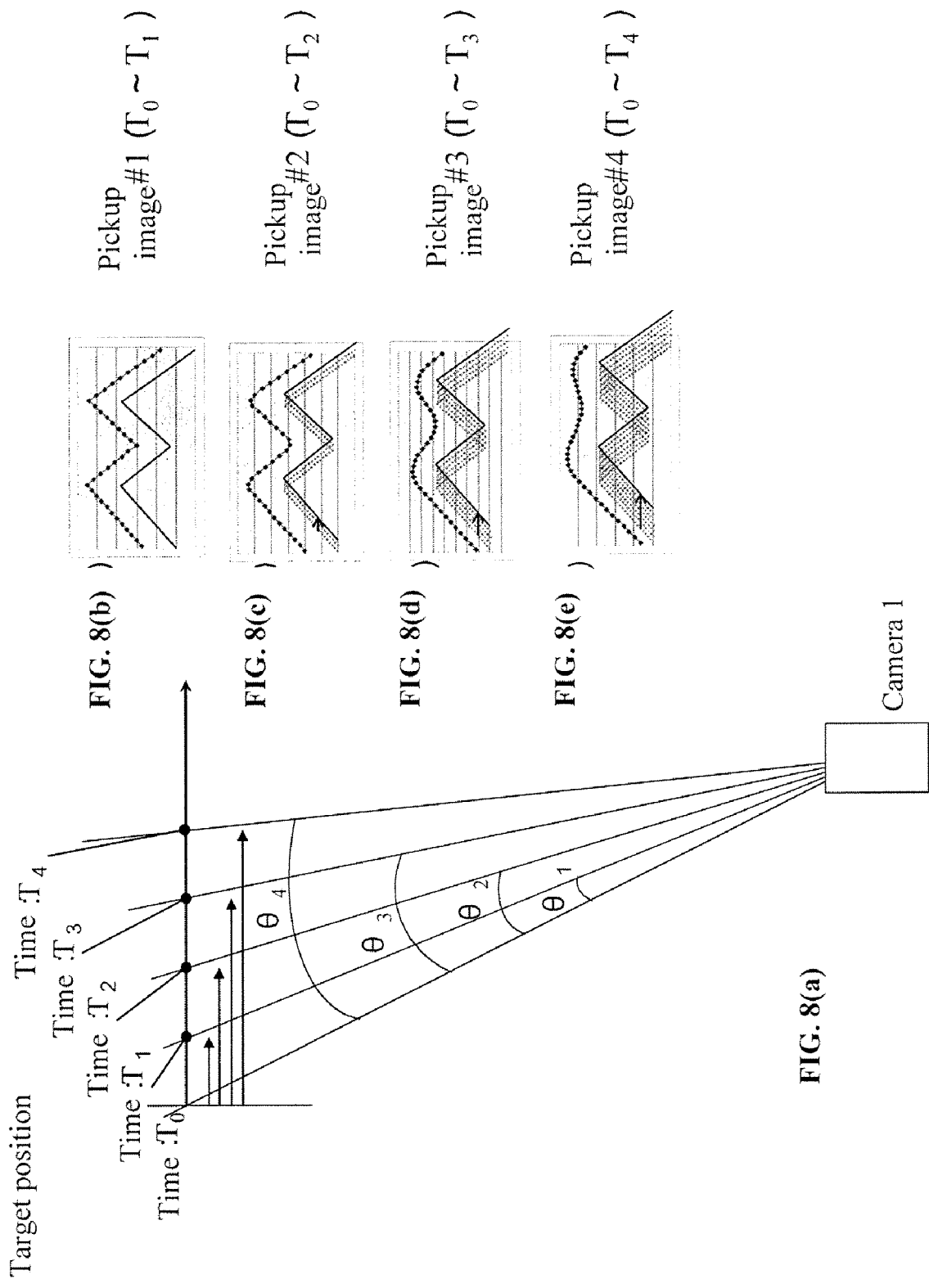
FIG. 8(a) is a schematic diagram that shows the movement of a target at times $T_0$-$T_4$ at intervals of T after prescribed time $T_0$ with respect to a camera.
FIGS. 8(b)-(e) show four pickup images that are captured in one frame while the camera is exposed for different exposure times.
Figure 9:
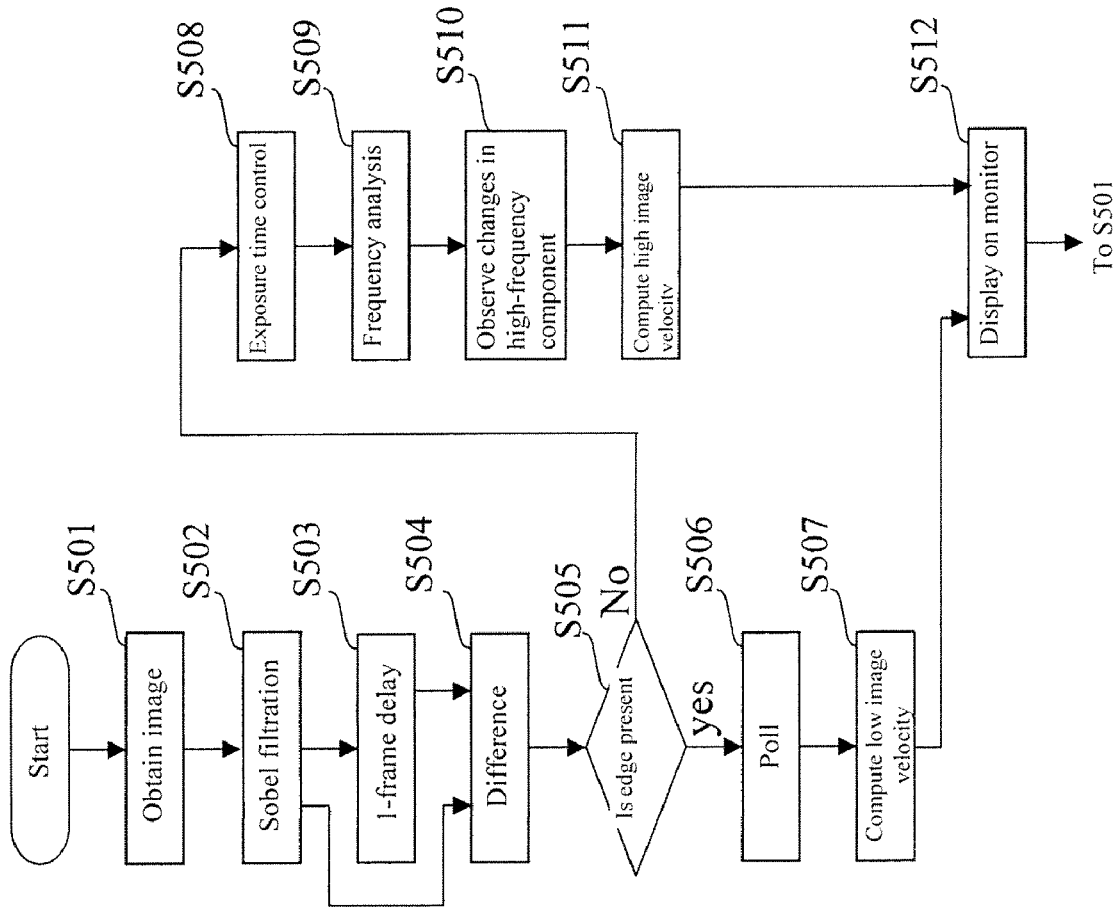
FIG. 9 shows a group of steps that are followed to allow an accurate image velocity calculation to be made using a camera that is capable of capturing images at multiple different exposure times as depicted in FIG. 8.

FIG. 9 shows a group of steps that are followed to allow an accurate image velocity calculation to be made using a camera that is capable of capturing images at multiple different exposure times as depicted in FIG. 8. The following explanation uses, as an example, the frequency analyses as described above as a method for computing image velocity (see FIG. 3). Because exactly the same processing as that in S401-S407 (see FIG. 6) is carried out in S501-S507 (see FIG. 9), a duplicative explanation will be omitted.

If a decision is made in S505 that no edge is present in the differential image as extracted in S504, then, in S508, the camera 1 or other pickup means is controlled so as to pickup images at multiple exposure times by changing the time in one frame at a prescribed rate. Next, in S509, the frequency analyses are applied to the multiple images captured at different exposure times. In S510, the exposure time at which the high-frequency component has reached a maximum and is steady is detected based on the results of the frequency analyses. Next, in S511, the reciprocal of the exposure time detected in S510 is computed as the image velocity. Finally, in S512, the pieces of the image velocity information computed in S507 and S511 are displayed on the monitor 5.

As described above, because the present embodiment is configured so as to process the images captured at the multiple different shutter speeds starting from prescribed time $T_0$, the target can be observed at multiple exposure times with reference to prescribed time $T_0$. In this manner, even the image velocity of a target that moves at a high velocity can be computed.

Because the images are captured at the multiple different exposure times within one frame, the processing time can be reduced. Furthermore, unlike in the embodiment depicted in FIG. 6 and described above, because the image velocity of the high-velocity movement area is not estimated, the velocity computation precision can be improved.

Here, the embodiments explained above are given in order facilitate understanding of the technical idea of the present invention. The do not restrict the present invention in any way. Therefore, the respective elements disclosed in the aforementioned embodiments are intended to include all design modifications and their equivalents that belong to the technical scope of the present invention.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed is:

1. An image velocity computing device comprising:
a camera with an optic axis, having a controllable exposure time and capable of capturing a plurality of images of objects, each of the plurality of images including a low-velocity movement area and a high-velocity movement area, wherein the low-velocity movement area is defined by at least one pixel close to the optic axis and a low-velocity moving object; and wherein the high-velocity movement area is defined by a plurality of pixels farther from the optic axis than the at least one pixel of the low-velocity movement area and a high-velocity moving object, the high-velocity moving object moving in a direction away from the optic axis faster than the low-velocity moving object based on a series of captured images;
a microcomputer coupled to the camera, the microcomputer configured to determine an image flow of an object of at least one pixel occurring in images captured by the camera, to determine an exposure time to achieve a predetermined image flow, and to compute an image velocity based on the exposure time of the camera and whether the object is in the low-velocity movement area or the high-velocity movement area; and a camera control, coupled to the microcomputer and to the camera, the camera control configured to receive exposure time information from the microcomputer and control the exposure time of the camera.

2. The image velocity computing device of claim 1, wherein the microcomputer is further configured to detect the low-velocity movement area and to determine an image velocity of the low-velocity moving object by counting a number of images for the low-velocity moving object to move by one pixel.

3. The image velocity computing device of claim 1, wherein the microcomputer is further configured to:

compute an image velocity in the low-velocity movement area by counting a number of images that the low-velocity moving object requires to move a predetermined number of pixels; and estimate an image velocity of an object in the high-velocity movement area based on the exposure time of the camera and the image velocity in the low velocity movement area.

4. The image velocity computing device of claim 3, wherein the image velocity in the low-velocity movement area corresponds to a velocity of the camera, and the estimate of the image velocity of the object in the high-velocity movement area corrects for the velocity of the camera.

5. The image velocity computing device of claim 1, wherein the predetermined pixel flow comprises less than two pixels.

6. The image velocity computing device of claim 1, wherein the predetermined pixel flow comprises one pixel.

7. A vehicle including the image velocity computing device according to claim 1 wherein the plurality of images further comprises a plurality of images in a driving direction of the vehicle.

8. The vehicle according to claim 7, further comprising: a monitor configured to display the plurality of images.

9. An image velocity computing device comprising:

a camera, having a controllable exposure time and capable of capturing a plurality of images of objects;

a microcomputer coupled to the camera, the microcomputer configured to determine an image flow of an object of at least one pixel occurring in images captured by the camera, to iteratively apply frequency analyses to the images to determine high frequency components, to reduce the exposure time until the determined high frequency components are approximately the same from image to image, and to compute an image velocity based on the exposure time of the camera; and a camera control, coupled to the microcomputer and to the camera, the camera control configured to receive exposure time information from the microcomputer and control the exposure time of the camera.

10. An image velocity computing device comprising:

a camera, having a controllable exposure time and capable of capturing a plurality of images of objects;

a microcomputer coupled to the camera, the microcomputer configured to determine an image flow of an object of at least one pixel occurring in images captured by the camera, to determine an edge strength of the images, reduce the exposure time until the edge strength remains approximately the same from image to image, and compute an image velocity based on the exposure time of the camera; and a camera control, coupled to the microcomputer and to the camera, the camera control configured to receive exposure time information from the microcomputer and control the exposure time of the camera.

11. An image velocity computer comprising:

pickup means for capturing a plurality of images of an object, each of the plurality including a low-velocity movement area and a high-velocity movement area, the low-velocity movement area including a low-velocity moving object and the high-velocity movement area including a high-velocity moving object, wherein the low-velocity movement area is defined by at least one pixel close to an optic axis of the pickup means; and wherein the high-velocity movement area is defined by a plurality of pixels farther from the optic axis than the at least one pixel of the low-velocity movement area, and the high-velocity moving object moving in a direction away from the optic axis faster than the low-velocity moving object based on a series of captured images;

means for determining image flow of the object equal to one pixel or more in the plurality of images captured by the pickup means as the object moves during an exposure time of the pickup means; and means for computing an image velocity based on an exposure time of the pickup means when the one-pixel movement determination means determines that the image flow is a one-pixel flow.

12. The image velocity computer in accordance with claim 11, wherein the means for computing an image velocity further comprises:

means for detecting the low-velocity movement area as an area where the one-pixel movement determination means determines that the image flow is less than one pixel; and means for computing the image velocity in the low-velocity movement area by counting a number of frames required for the low-velocity moving object to move by one pixel when a decision is made by the low-velocity movement area detection means that the object has moved for more than one pixel.

13. The image velocity computer in accordance with claim 12, wherein the object is determined to be in the high-velocity movement area, and the means for computing an image velocity further comprises means for estimating velocity of the object in the high-velocity movement area based on the exposure time of the camera and the image velocity in the low-velocity movement area.

14. A vehicle including the image velocity computer according to claim 11 wherein the plurality of images further comprises a plurality of images in a driving direction of the vehicle.

15. The vehicle according to claim 14, further comprising: means for displaying the plurality of images.

16. A method for determining a velocity of an object comprising:

capturing a plurality of images of the object with a camera including an optic axis, each of the plurality of images including a low-velocity movement area and a high-velocity movement area and the object being in the low-velocity movement area or the high-velocity movement area, wherein the low-velocity movement area is defined by at least one pixel close to the optic axis and a low-velocity moving object; and wherein the high-velocity movement area is defined by a plurality of pixels farther from the optic axis than the at least one pixel of the low-velocity movement area and a high-velocity moving object, the high-velocity moving object moving in a direction away from the optic axis faster than the low-velocity moving object based on a series of captured images;

determining whether the object is moving more than a predetermined number of pixels in the images;

changing a shutter speed on the camera until the object is determined to be moving at or below the predetermined number of pixels per image; and calculating an object velocity based on the shutter speed of the camera when the object is determined to be moving at or below the predetermined number of pixels per image.

17. The method of claim 16, wherein calculating the object velocity based on the shutter speed of the camera further comprises:

computing an image velocity in the low-velocity movement area by counting a number of images that the low-velocity moving object requires to move a predetermined number of pixels; and estimating the object velocity based on the exposure time of the camera and the image velocity in the low-velocity movement area.

* * * * *